United States Patent [19]
Burch et al.

[11] 3,933,050
[45] Jan. 20, 1976

[54] SPEED CALCULATOR

[75] Inventors: John L. Burch, Decatur; James C. Billions, Huntsville, both of Ala.

[73] Assignee: The United States of America as represented by the United States National Aeronautics and Space Administration Office of General Counsel-Code GP, Washington, D.C.

[22] Filed: Feb. 27, 1974

[21] Appl. No.: 446,563

[52] U.S. Cl. .................... 73/488; 73/499; 58/152 E
[51] Int. Cl.² .......................................... G01P 3/64
[58] Field of Search ............ 73/488, 499; 235/104; 58/74, 50 R, 152 E; 240/6.43; 116/DIG. 37, 129 L

[56] References Cited
UNITED STATES PATENTS

| | | | |
|---|---|---|---|
| 772,625 | 10/1904 | Montandon | 235/104 |
| 960,946 | 7/1910 | Jones | 116/DIG. 37 |
| 1,059,985 | 4/1913 | Finster et al. | 58/74 |
| 1,572,884 | 2/1926 | Colvin | 58/152 E X |
| 3,514,940 | 6/1970 | Keane et al. | 240/6.43 X |
| 3,574,993 | 4/1971 | Black | 58/50 R |

*Primary Examiner*—James J. Gill
*Attorney, Agent, or Firm*—Wayland H. Riggins; L. D. Wofford, Jr.; John R. Manning

[57] ABSTRACT

An apparatus for measuring the velocity of a vehicle traveling between first and second measured points. The apparatus includes a cylindrical housing having an open top for receiving a transparent disk. Indicia representing speed calibrations is circumferentially spaced adjacent an outer perimeter of the disk. A stopwatch is carried in the housing below said disk and has a rotatable hand which rotates at a predetermined rate under the indicia. A lamp is carried below the stopwatch for illuminating the indicia carried on the transparent disk. The stopwatch is started when the vehicle passes a first reference point and stopped when the vehicle passes the second reference point. Thus, when the hand is stopped, such points to the calibrated indicia on said disk indicating the velocity of a vehicle.

5 Claims, 6 Drawing Figures

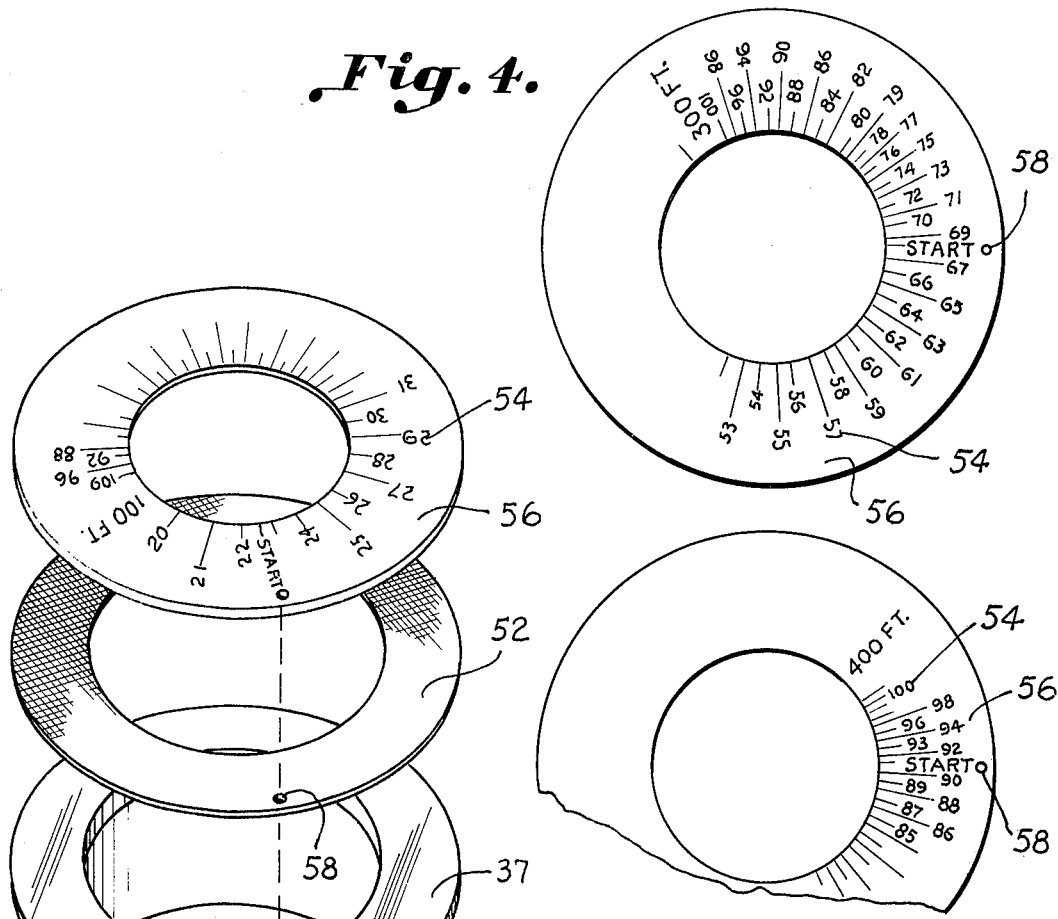
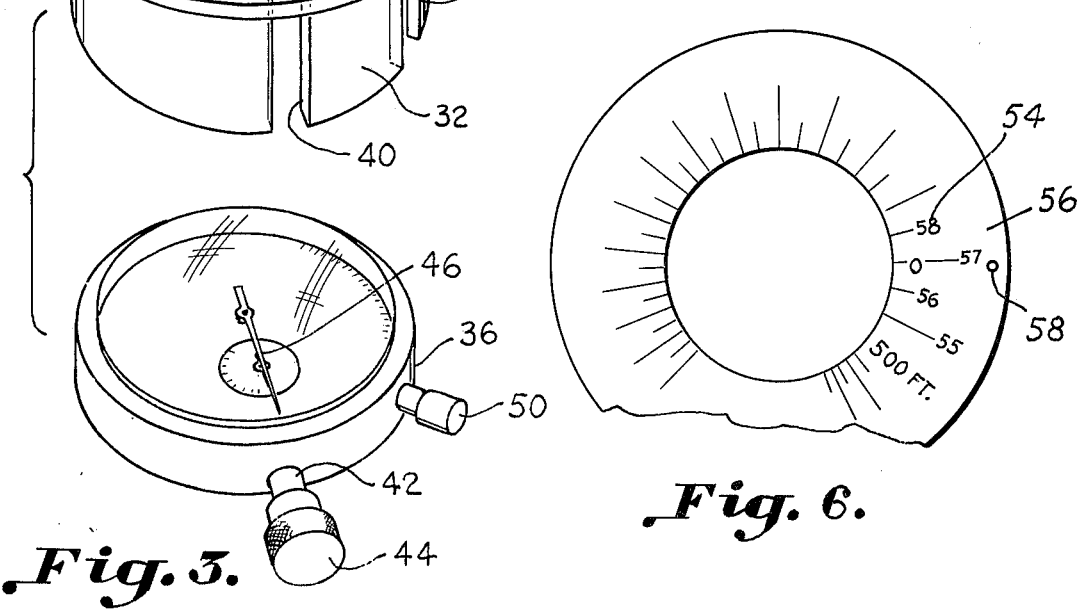

3,933,050

SPEED CALCULATOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a speed calculator and more particularly to an apparatus for measuring the velocity of a vehicle traveling between two given points.

Various methods and devices have been utilized by highway patrolmen and the like for measuring the speed of vehicles on highways. Such devices operate satisfactorily; however, the most sophisticated systems such as radar is expensive. The radar system also must be set up outside the vehicle requiring a certain amount of setup time. While the existing devices have proven to be satisfactory, there is a definite need of providing an inexpensive, simple and accurate device for checking the speed of vehicles. Since the device constructed in accordance with the present invention is relatively inexpensive, it can be made available to both highway patrolmen and policemen who are stationed on foot in areas such as school zones and the like.

SUMMARY OF THE INVENTION

The invention comprises an apparatus for measuring the velocity of a vehicle traveling between first and second measured points. The apparatus includes a cylindrical housing having an open top with a transparent disk carried adjacent thereto. Indicia representing speed calculations is circumferentially spaced adjacent an outer perimeter of the disk. A stopwatch is carried in the housing below the disk. The stopwatch has a rotatable hand which rotates at a predetermined rate under the indicia when started. A pushbutton is provided for starting the rotation of the hand from a reference point when the vehicle passes the first point and for stopping the rotation of the hand when the vehicle passes a second point. Thus, the hand, when stopped, points to the calibrated indicia on the disk indicating the velocity the vehicle was traveling between the first and second measured points. A lamp is carried in the cylindrical housing below the stopwatch for directing light upwardly and outwardly towards the indicia carried on the disk for illuminating the indicia so that such can be readily read. A compartment is provided in the bottom portion of the cylindrical housing for storing a plurality of the transparent disks calibrated for measuring the speed of vehicles traveling between reference points of various distances.

Accordingly, it is a general object of the present invention to provide a relatively simple and inexpensive speed calculator.

A more specific object of the invention is to provide a speed calibrator which is small in size and requires very little skill to operate.

Another important object of the present invention is to provide a speed calibrator which includes a lamp for illuminating indicia so that the velocity of a vehicle traveling between two reference points can be readily determined.

BRIEF DESCRIPTION OF THE DRAWING

FIG. 1 is a plan view illustrating the top of an apparatus constructed in accordance with the present invention for calibrating the speed of vehicles and the like.

FIG. 3 is an enlarged, perspective view expanded to show various components carried within the apparatus illustrated in FIG. 2, and FIGS. 4, 5 and 6 are plan views of disks calibrated for measuring the velocity of vehicles traveling between reference points of various distances.

DESCRIPTION OF A PREFERRED EMBODIMENT

Figure 1:
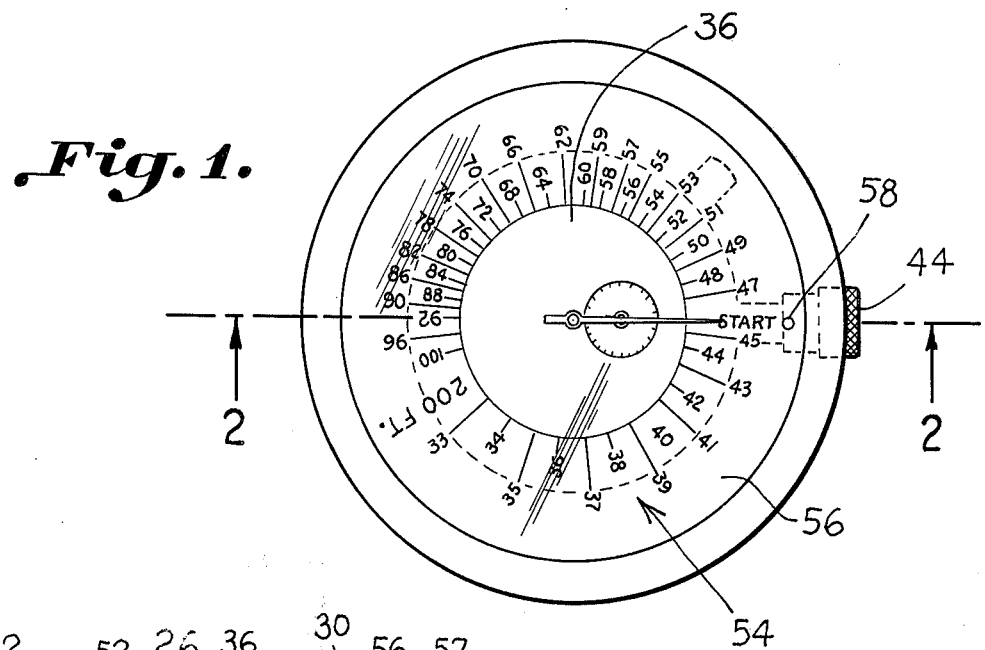

Referring in more detail to the drawings there is illustrated an apparatus constructed in accordance with the present invention which includes a cylindrical housing 10 constructed of any suitable material such as cast metal. The housing has internal threads 12 adjacent the top thereof and internal threads 14 adjacent the bottom thereof. A cylindrical cup-shaped member 16 which has threads 18 adjacent the bottom thereof is threaded within the internal threads 12 of the cylindrical housing 10. Integral with an upper portion of the cup-shaped member 16 is an outwardly extending flange 20 which has a flange 22 extending upwardly therefrom. The circumferential flange 22 has threads 24 on an outer surface thereof for securing a circular cover 26 thereto. The cover 26 has an inwardly extending flange 28 for holding a transparent disk 30 on top of the upwardly extending flange 22.

Figure 2:
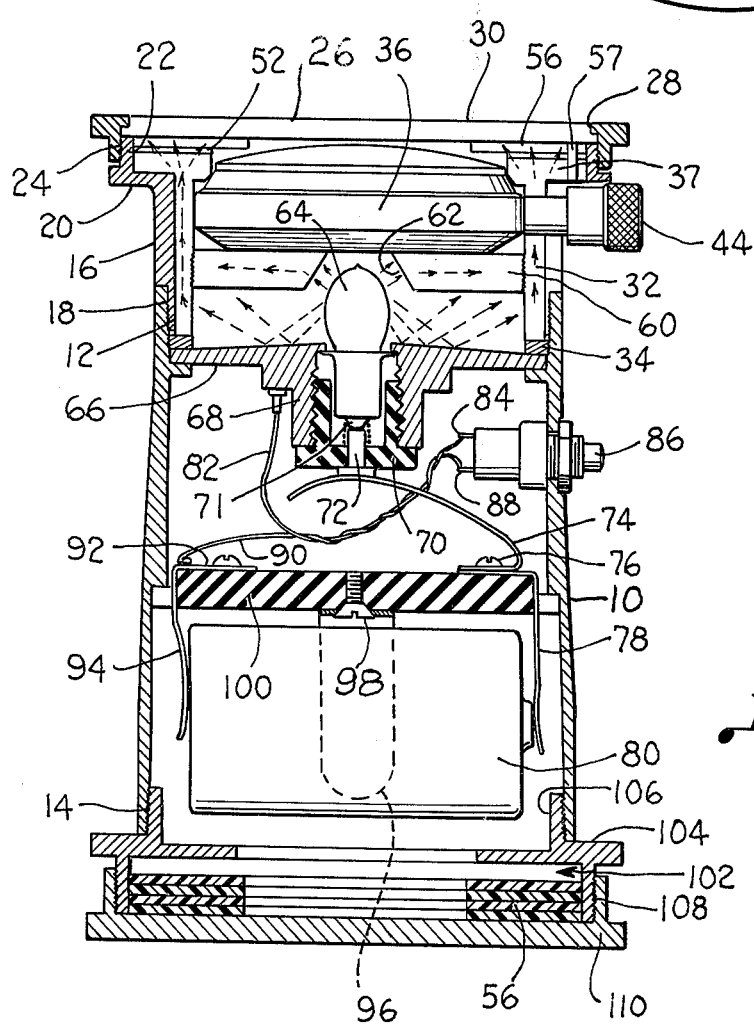
FIG. 2 is a cross-sectional view taken along line 2–2 of FIG. 1.

A cylindrical transparent member 32 is carried within the cup-shaped member 16 with a lower portion thereof resting on an inwardly extending flange 34 threaded within the cylindrical housing 10. Integral with an upper portion of the wall of the transparent member 32 is a circular transparent flange 37 which has a circular opening provided therein through which a face portion of a stopwatch 36 extends. A vertical slot 40 is provided in the wall of the transparent member 32 for receiving a shank portion 42 of a plunger 44 which is used for stopping and starting the rotation of a hand 46 of the stopwatch 36. Another vertical slot 48 is provided in the wall of the transparent member 32 for permitting a reset plunger 50 of the stopwatch 36 to extend therethrough. Corresponding slots are provided in the cup-shaped member 16 for permitting the plunger 44 and the reset plunger 50 to extend outside the housing as shown in FIG. 2.

The stopwatch 36 may be any suitable conventional stopwatch and the one illustrated in the drawing is calibrated so that the hand 46 rotates one complete revolution each three seconds.

Positioned on top of the transparent flange 37 is a translucent plastic disk 52 which disperses light causing such to impinge on indicia 54 carried on a transparent disk 56. An upwardly extending pin 57 is carried within the flange 37 of the transparent member 32 for properly positioning the translucent disk 52 and transparent disk 56 thereon. A hole 58 such as shown in FIG. 1, extends through the translucent disk 52 and the transparent disk 56 for properly positioning the disks relative to the rotating hand 46 of the stopwatch 36.

The stopwatch 36 is held in position with an upper portion flush against the flange 37 by means of a plexiglass disk 60 which has threads on a perimeter thereof for securing such within the cup-shaped transparent member 32 which also has internal threads thereon. The disk 60 has a frusto-conical opening 62 provided in the center thereof which gathers light emitted from a bulb 64 and transfers such through the disk 60 up through the transparent member 32 to the transparent disk 56. The lamp 64 is carried within a metallic housing which includes a convex circular reflector 66. The reflector 66 has a downwardly extending cylindrical portion 68 provided with internal threads therein. A plug 70 is threaded within the cylindrical portion 68 of the disk for securing the lamp 64 therein. A rim of the lamp 64 is in electrical contact with the metallic disk 66. An electrode 71 is carried on the bottom of the lamp 64 in contact with an electrical plug 72. The plug 72 is coupled by means of a wire 74 to a terminal 76 which is, in turn, connected by means of a copper member 78 to the positive end of a battery 80. Wire 82 is coupled between the metallic reflector 66 and one terminal 84 of a push button switch 86. Another terminal 88 of the pushbutton switch 86 is connected by means of a wire 90 to a terminal 92. The terminal 92 has extending downwardly therefrom a spring-biased conductive member 94 which engages the bottom side of the battery 80.

The battery 80 is secured within the housing by a pair of arcuate shaped spring-biased members 96 which are secured by a screw 98 to a plate 100 carried within the housing. The plate 100 may be attached by any suitable means to the inner walls of the cylindrical member 10.

A compartment generally designated by the reference character 102 is provided adjacent the bottom of the cylindrical housing 10 for accommodating a plurality of the disks 56. The compartment is defined by a cylindrical cup-shaped member 104 which is secured to the bottom of the cylindrical housing 10 by threads carried on an upwardly extending flange 106. A downwardly extending flange 108 has threads thereon for receiving a removable cover 110. The disks 56 carried within the compartment 102 are spare disks having indicia 54 provided thereon calculated for measuring the speed of vehicles between two reference points of various lengths. For example, in FIGS. 4, 5 and 6 (only a portion of the indicia 54 is shown) the indicia 54 is calculated for measuring the speed of vehicles traveling between points which are 300, 400, and 500 feet apart.

In operation, the operator of the apparatus first selects a highway or road that has been previously marked off with white lines in predetermined distances. For example, the distance between the first and second painted line on the highway may be 200 feet so as to use the disk shown in FIG. 1. When the vehicle passes the first painted line, the operator depresses the plunger 44 starting the stopwatch. When the vehicle passes over the second painted line on the highway, the plunger 44 is depressed to stop the stopwatch. The hand 46 begins rotating upon depressing the plunger 44 the first time and stops when the plunger 44 is depressed the second time. The indicia 54 printed on the face of the disk 56 is calibrated for directly reading the speed of the vehicle traveling between the first and second line. The stopwatch 36 provided for use with the disk 56 shown in FIGS. 1, 4, 5 and 6 rotates one complete revolution each three seconds.

When it is desired to measure the speed of a vehicle between two points of a different distance such as 400 feet, then the cap 110 is unscrewed and the appropriate disk, as shown in FIG. 5 is selected. The top cap 26 is screwed off the top of the cylindrical member 10 and the disk 56 shown in FIG. 5 is placed on top of the translucent disk 52 with the pin 57 extending through the hole 58. The purpose of the pin 57 and the hole 58 is to align the disk 56 with the starting point of the stopwatch 36.

When the device is used at night the switch 86 is depressed causing light from lamp 64 to be directed by plexiglass disk 60 and by cylindrical member 32 upwardly for illuminating the indicia 54 on disk 56 so as to take a reading.

While a preferred embodiment of the invention has been described using specific terms, such description is for illustrative purposes only, and it is to be understood that changes and variations may be made without departing from the spirit or scope of the following claims.

What is claimed is:

1. An apparatus for measuring the velocity of a vehicle traveling between first and second measured points comprising:
   a cylindrical housing comprising a separable, cylindrical, cup-shaped, top portion having an open top end;
   a separable, removable transparent disk carried adjacent said open top end of said top portion;
   indicia representing speed calibrations circumferentially spaced adjacent an outer perimeter of said disk;
   a stopwatch carried in said cup-shaped top portion below said disk;
   said stopwatch having a rotatable hand which rotates at a predetermined rate under said indicia when started;
   a separable cylindrical member encompassing said stop watch and supported within said cup-shaped top portion;
   an upwardly extending reference element carried on said cylindrical member at the upper end thereof;
   said transparent disk having an opening therein into which said upwardly extending reference element extends for positioning said transparent disk in a predetermined position relative to said stopwatch;
   means for starting the rotation of said rotatable hand from a reference point when said vehicle passes said first measured point and for stopping the rotation of said hand when said vehicle passes said second measured point;
   whereby said hand when stopped points to said calibrated indicia on said disk indicating the velocity said vehicle was traveling between said first and second measured points;
   a removable cover engaging said top portion and comprising a transparent central portion overlying said stopwatch and said disk whereby said cover may be removed and said disk readily replaced with an alternate disk.

2. The apparatus as set forth in claim 1 wherein said open top end of said top portion comprises an outwardly extending flange, said cylindrical member having an outwardly extending flange supported on said flange of said top portion, said transparent disk being supported on said flange of said cylindrical member, said upwardly extending reference element carried on said outwardly extending flange of said cylindrical member.

3. The apparatus as set forth in claim 1 further comprising:
   a. a lamp carried in said cylindrical housing below said stopwatch, b. said cylindrical member being transparent,
c. means for selectively energizing said lamp, and
d. means for directing illumination produced by said lamp when energized through said transparent cylindrical member to said transparent disk for illuminating said indicia carried on said disk.

4. The apparatus as set forth in claim 3 wherein:
a. said means for directing illumination includes a convex reflector having a hole in the center thereof, and
b. said lamp extending through said hole for directing light upwardly and outwardly for illuminating said indicia carried on said transparent disk.

5. The apparatus as set forth in claim 1 further comprising:
a. a compartment provided in a bottom portion of said cylindrical housing for storing a plurality of said transparent disks with indicia provided thereon representing various speed calibrations, and
b. a removable cover carried by a bottom portion of said compartment for providing access to said disks.

* * * * *